United States Patent [19]

Cornwall

[11] Patent Number: 4,638,829
[45] Date of Patent: Jan. 27, 1987

[54] FIRESTOP FITTING FOR CARRIER MOUNTED WATER CLOSETS

[76] Inventor: Kenneth R. Cornwall, 902 Summit North, Atlanta, Ga. 30324

[21] Appl. No.: 732,055

[22] Filed: May 9, 1985

Related U.S. Application Data

[63] Continuation-in-part of Ser. No. 555,121, Nov. 25, 1983, Pat. No. 4,583,565.

[51] Int. Cl.⁴ ............................................. F16K 17/14
[52] U.S. Cl. .................................... 137/75; 137/362; 285/64; 4/252 R; 220/89 B
[58] Field of Search ....................... 137/67, 72, 74, 75, 137/362; 4/252 R; 285/56, 64; 220/319, 320, 321, 89 B

[56] References Cited

U.S. PATENT DOCUMENTS

| | | | |
|---|---|---|---|
| 345,447 | 7/1886 | Putzeys | 137/74 X |
| 1,510,813 | 10/1924 | Williams | 137/75 |
| 1,956,858 | 5/1934 | Densten | 137/75 |
| 2,128,292 | 8/1938 | Finn | 137/75 |
| 2,367,402 | 1/1945 | Kelly | 137/75 X |
| 3,014,223 | 12/1961 | Pope | 285/64 X |
| 3,020,565 | 2/1962 | Manas | 4/252 R |
| 3,398,979 | 8/1968 | Pope | 285/64 |
| 3,726,050 | 4/1973 | Wise | 137/25 X |
| 4,139,005 | 2/1979 | Dickey | 137/74 X |
| 4,253,583 | 3/1981 | Lynch | 220/319 |

*Primary Examiner*—Harold W. Weakley
*Attorney, Agent, or Firm*—Ian C. McLeod

[57] ABSTRACT

A firestop fitting (10, 30) for mounting on a water closet carrier (200, 300) is described. The fitting includes a releasable plug (13) and is used for preventing the spread of fire through plastic pipe between floors of a building.

8 Claims, 5 Drawing Figures

4,638,829

FIRESTOP FITTING FOR CARRIER MOUNTED WATER CLOSETS

CROSS-REFERENCE TO RELATED APPLICATIONS

This application is a continuation-in-part of my application Ser. No. 555,121, filed Nov. 25, 1983, now U.S. Pat. No. 4,583,565 issued Apr. 22, 1986.

BACKGROUND OF THE INVENTION (1) Field of the Invention

The present invention relates to a firestop fitting for carrier mounted water closets in plastic piping systems. In particular the present invention relates to a carrier mounted fitting which prevents the spread of fire between floors in plastic piping systems by means of a releasable plug on the fitting.

(2) Prior Art

Pipe penetrations through floors in multi-story buildings create a number of problems because a seal between the floors is broken by the combustible pipe. The problem of fire safety when combustible piping penetrates fire rated floors and walls is particularly troublesome, since these openings can jeopardize the fire integrity of the entire building. As a result in most buildings, plastic (PCV) pipe is not used, since fire can easily penetrate the floor by burning the pipe. A primary problem has been to develop a device which solves the fire safety problem associated with pipe penetrations so that plastic pipe can be used. The prior art has not provided a solution to this problem which is acceptable to fire marshalls, government officials, insurance companies and others.

The prior art has described fittings for iron or steel pipe which have a ball supported by a low temperature melting metal support. This includes U.S. Pat. No. 1,106,426 to Taylor; 1,510,813 to Williams and 2,128,292 to Finn. These fittings are satisfactory for metal pipe but not for plastic pipe.

A further problem has been to develop a fitting which can be supported by a conventional carrier for a water closet. In the prior art, these fittings have no means for preventing the spread of fire between floors and thus do not provide any fire protection.

OBJECTS

It is therefore an object of the present invention to provide a firestop fitting for use with a water closet carrier so that plastic pipe can be used in buildings. Further it is an object of the present invention to provide a firestop carrier mounted fitting which is activated by the fire to create a seal between floors and which in normal use does not interfere with the primary fluid carrying function of the plastic pipe. Further still, it is an object of the present invention to provide a firestop carrier mounted fitting which satisfies those people responsible for the safety of new building construction. These and other objects will become increasingly apparent by reference to the following description and the drawings.

IN THE DRAWINGS

GENERAL DESCRIPTION

Figure 1:
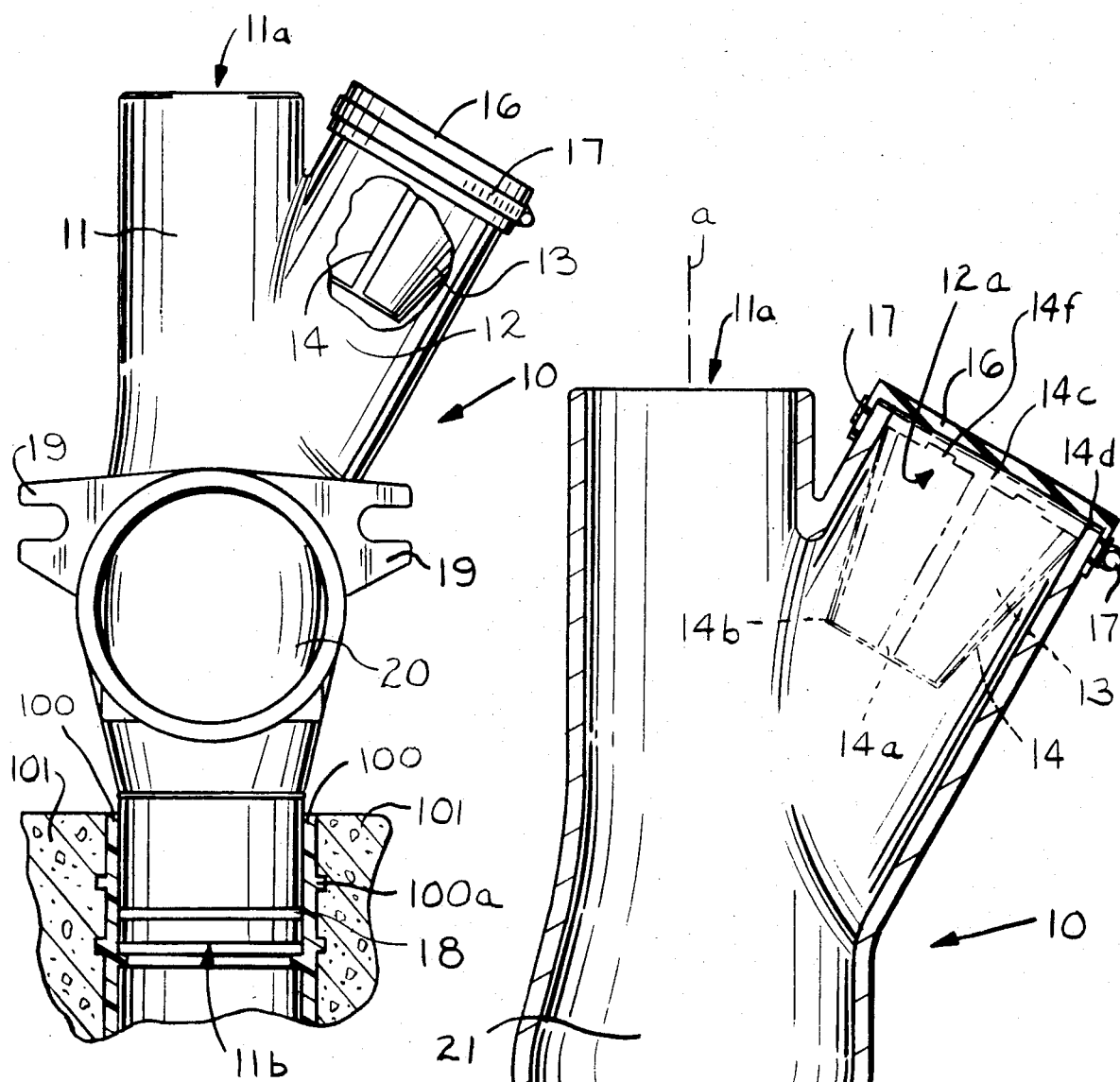
FIG. 1 is a front view of the firestop fitting (10) for carrier (200) mounting in a mounting coupling (100) and particularly showing the mounting of a thermally releasable plug (13) in an extension conduit (12) from a main conduit (11) of the fitting (10).

The present invention relates to an improved fitting for a fluid connection to a water closet which is supported on a carrier mounted on a floor of a building and which fitting prevents spread of fire between the floor of the building through a pipe connected to the fitting which comprises:

a non-flammable, fluid carrying main conduit having a first longitudinal axis between two opposed openings and adapted to be connected into pipes between floors of a building;

a non-flammable extension conduit for the main conduit positioned with a second axis at an angle from the longitudinal axis of the main conduit with an opening;

a non-flammable plug mounted in the extension conduit so as to be releasable upon exposure to heat from a fire in the building to thereby move into and close the main conduit;

closure means for the extension conduit opening;

a side opening in the main conduit for fluid connection by a short pipe to the water closet; and attachment means on the fitting for connecting the fitting to the carrier.

Further, the present invention relates to a building construction which prevents spread of fires between a floor of the building through a pipe through the floor connected to a fitting for a fluid connection to water closest which is supported on a carrier mounted on the floor which comprises:

a fitting including, a non-flammable, fluid carrying main conduit having a first longitudinal axis between two opposed openings which is vertically oriented, a non-flammable extension conduit from the main conduit positioned with a second longitudinal axis at an angle to the first axis with an opening, a non-flammable plug mounted in the extension conduit so as to be releasable upon exposure to heat from a fire in the building to thereby move into the main conduit, closure means for the extension conduit opening, a side opening in the main conduit for fluid connection of a short pipe to a water closet and attachment means on the fitting for connecting the fitting to the carrier;

the carrier being mounted on the floor with the attachment means of the fitting mounted on the carrier; and the pipe connected to the openings of the main conduit.

Finally the present invention relates to the method for mounting a water closet on a carrier with a fitting for a fluid connection to the water closest so as to prevent the spread of a fire between a floor in a building through a pipe connected to the fitting which comprise:
  providing the pipe through a floor;
  providing a fitting including a non-flammable, fluid carrying main conduit having a first longitudinal axis between two opposed openings connected to the vertically oriented pipe; a non-flammable extension conduit from the main conduit positioned with a second axis at an angle from the longitudinal axis of the main conduit with an opening; a non-flammable plug mounted in the extension conduit so as to be releasable upon exposure to heat from a fire in the building to thereby move into and close the main conduit; closure means for the extension conduit opening; a side opening in the main conduit for fluid attachment of a short pipe to a water closest and attachment means on the fitting which mounts the fitting to the carrier and which is mounted adjacent the wall and on the floor;
  mounting a carrier for the water closet on the floor adjacent the side opening in the main conduit and mounting the fitting on the carrier; and
  mounting the water closest on the carrier using the attachment means and connecting the short pipe between the fitting side opening and the water closet.

SPECIFIC DESCRIPTION

Fitting

Figure 2:
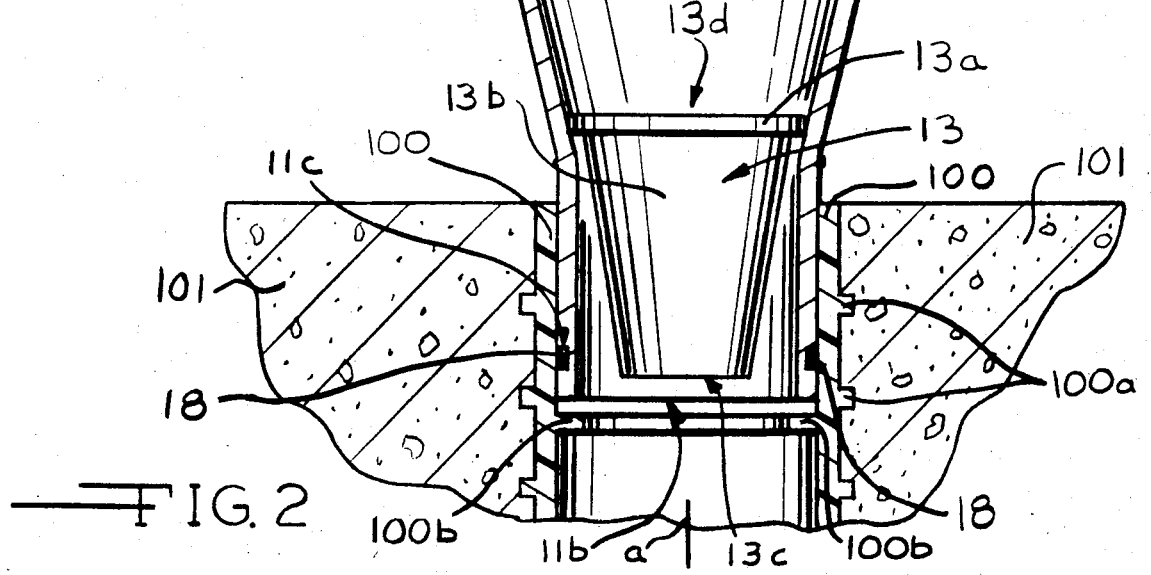
FIG. 2 is a front cross-sectional view of the carrier firestop fitting (10) and coupling (100) of FIG. 1, particularly showing an angle alpha between the main conduit (11) and extension conduit (12) and showing the fire activated or thermally released plug (13).
Figure 3:
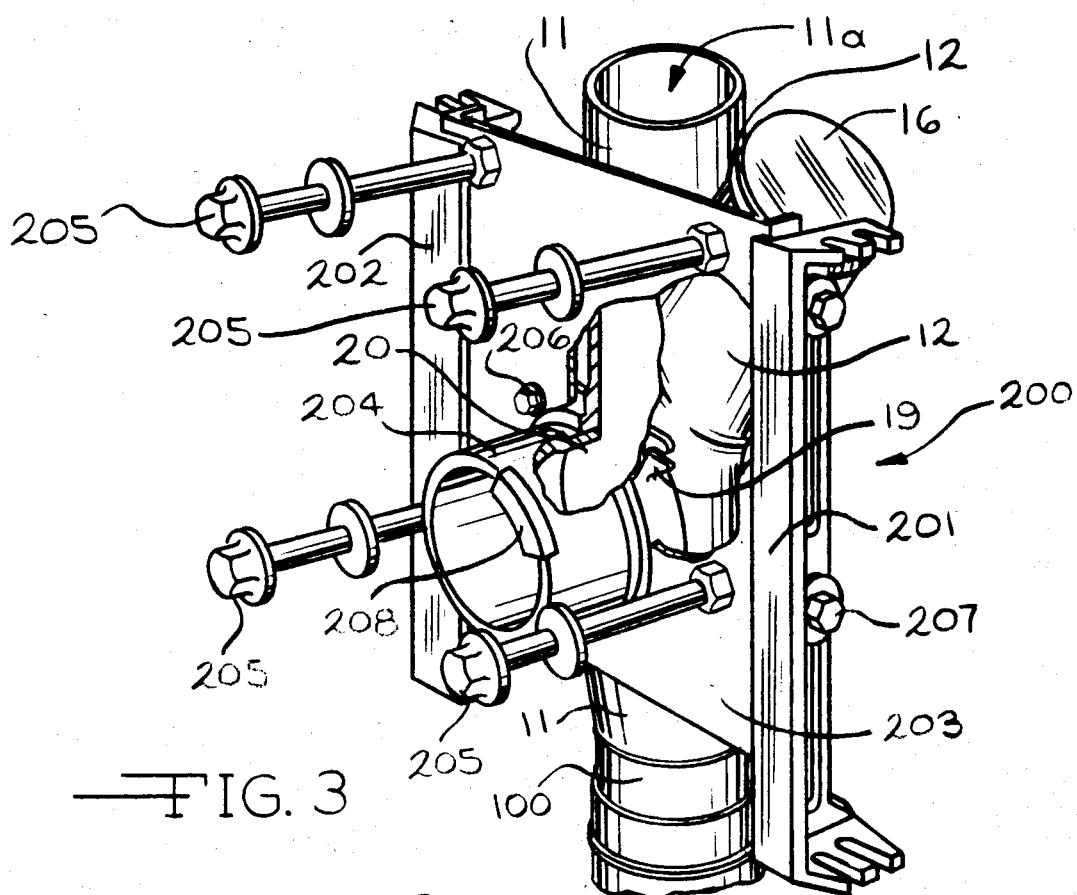
FIG. 3 is an isometric partial cross-sectional view of the fitting (10) mounted on a carrier (200).

A preferred fitting 10 is shown in FIGS. 1 to 3 and is similar in some respects to the fitting shown in my application Ser. No. 555,121, filed Nov. 25, 1983. The fitting 10 includes a main conduit 11 and an extension conduit 12. The main conduit 11 includes opening 11a and 11b for fluid passage in normal use. The extension conduit 12 includes an opening 12a which serves to support a releasable plug 13. The plug 13 is in the shape of a hollow truncated cone and includes a ring 13a, a body 13b, an apex end 13c, and an opposite base end 13d. It is generally hollowed out from the base end 13d towards the apex end 13c to reduce the weight of the plug 13. The plug 13 is mounted adjacent to opening 12a in extension conduit 12 by means of a thermal release harness 14. The harness 14 is integral and includes overlapping straps 14a and 14b and a holding ring 14c supported on opening 12a by lip 14d. The harness 14 includes retainers 14e which hold the plug 13 in place after the plug 13 is inserted in the harness 14. The harness 14 is held in place over the opening 12a. The cap 16 is held in place by ring clamp 17.

A ring seal 18 is provided in groove 11c between the coupling 100 and the main conduit 11 of the fitting 10 to prevent fluid leakage. The opening 11b is spaced from an internal ring 100b of a coupling 100 which allows the fitting 10 to be press fit into the coupling 100. Conventional pipe (not shown) is connected to the coupling 100.

The opposite opening 11a of the main conduit 11 is connected to piping 100 usually by means of standard ring clamps around a rubber connector collar (not shown). This type of connection is well known to those skilled in the art.

The fitting 10 is provided with attachment ears 19 which is used to bolt the fitting 10 to a carrier 200 as shown in FIG. 3. The fitting 10 has an opening 20 which is used to couple the fitting to a water closest (not shown, see FIG. 5). The fitting 10 includes a chamber 21 wider in diameter than the openings 11a and 11b to accommodate waste flow from the opening 20.

Coupling

Figure 5:
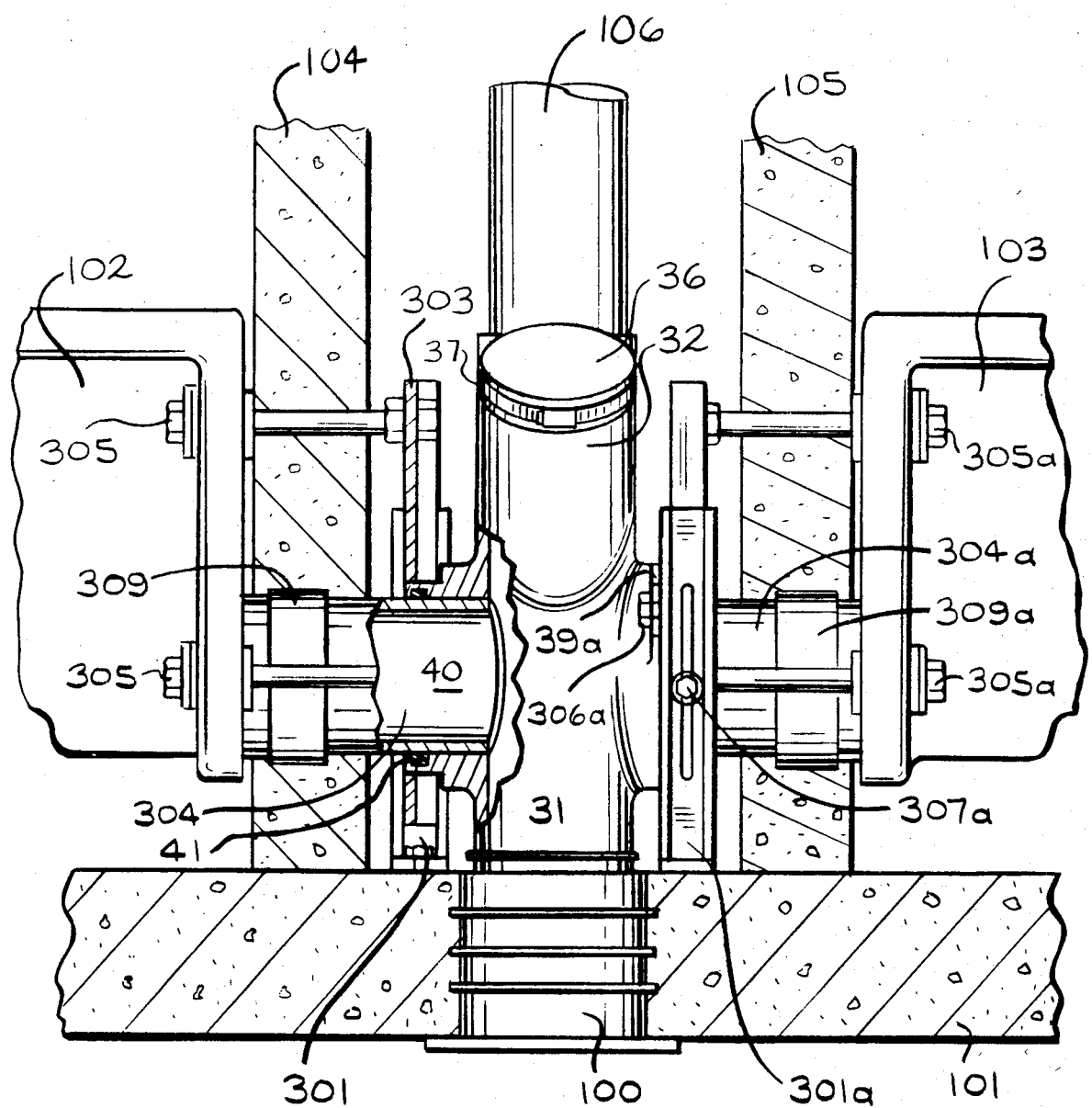
FIG. 5 is a side view in partial section of the fitting (30) shown in FIG. 4.

As shown in FIGS. 1, 2 and 5, the preferred coupling 100, preferably composed of rigid PVC, is designed to be poured-in-place in the concrete floor or slab 101. This coupling 100 is described in U.S. patent application Ser. No. 500,538, filed June 1, 1983. It is preferably provided in various diameters of Type I PVC schedule 40 IPS DWV, conforming to U.S. Commercial Standard C.S. 272-65, ASTM 2665-74, and FHA revision 31 to M.P.S., and supplied in heights corresponding to the depth of the concrete pour of the floor 101. A removable plastic cap (not shown) protects the coupling 100 during the concrete finishing process. Anchor rings 100a are molded in at one inch (2.54 cm) or other unit intervals on the exterior surface of the coupling 100. When the cast iron fitting 10 is inserted into the coupling 100, the plastic wall of the coupling 100 is sandwiched between the fitting 10 and the concrete floor 101, allowing it to withstand extremely high temperatures without melting or burning due to the lack of oxygen.

The coupling 100 serves three purposes in the fitting 10 and coupling 100 combination: (1) it provides a base for insertion and anchoring of the cast iron fitting 10; (2) it provides for solvent weld connection to PVC piping (not shown) below the fitting 10; and (3) the PVC is compatible with poured concrete floor 104 and will not rust or pull away.

Carrier

The carrier 200 is standard and is manufactured by J. R. Smith of Montgomery, Ala. The carrier 200 includes spaced apart upright posts 201 and 202 and mounting plate 203. The plate 203 has an opening through which a short length of pipe 204 connects to the water closet (not shown). Bolts 205 hold the water closet to the pipe 204. The attachment ears 19 are secured to the plate 203 by means of bolts 206. Bolts 207 secure the posts 201 to the plate 203. A ring seal 208 for connection to a water closet (not shown) is shown in partial section.

Figure 4:
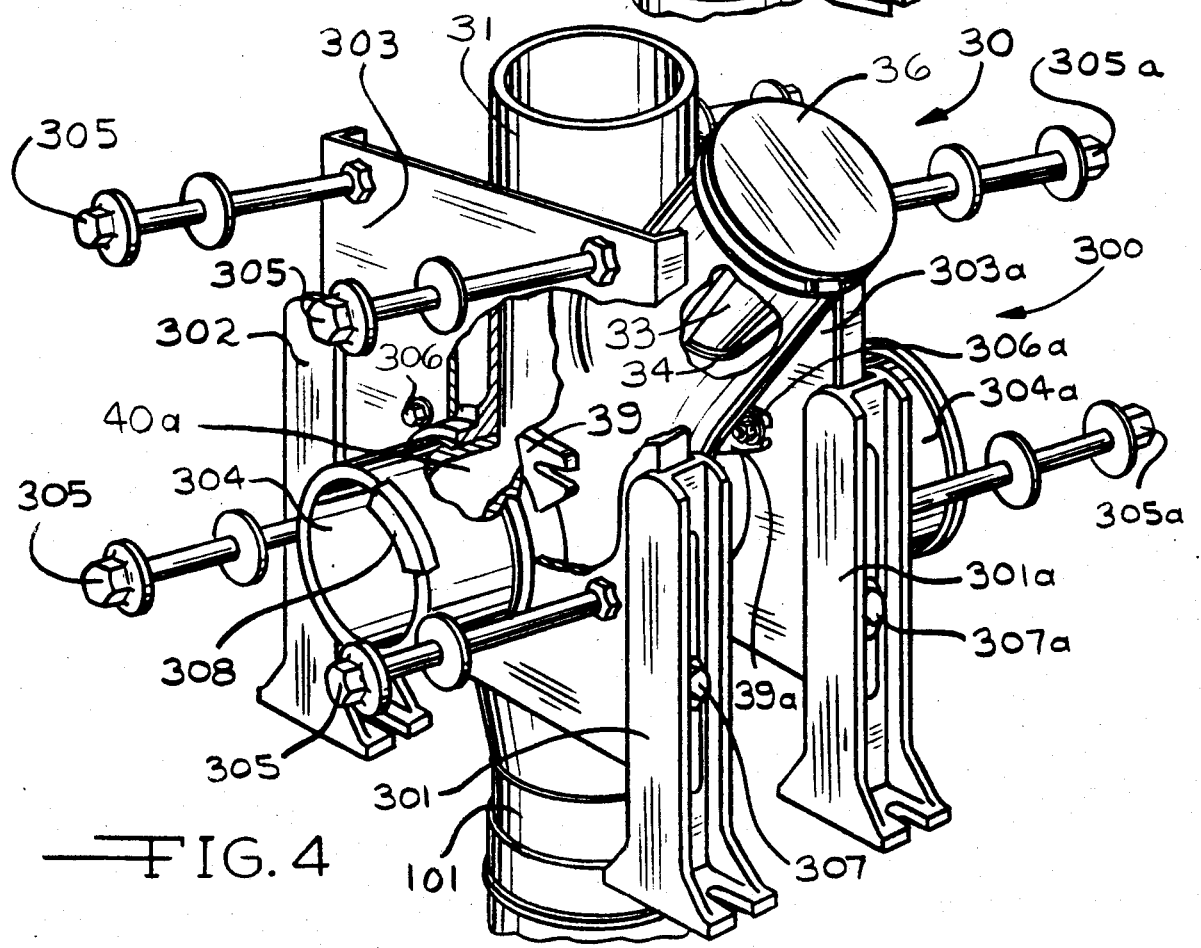
FIG. 4 is an isometric partial cross-sectional view of a fitting (30) mounted on a carrier (300) with double openings (40a) for mounting to water closests (102 and 103) opposite each other through walls (104 and 105) as shown in FIG. 5.

FIGS. 4 and 5 show a dual opening 40a fitting 30 for two water closets 102 and 103 which is mounted on a carrier 300 with dual posts 301, 301a and 302 (one is not shown), plates 303 and 303a, pipes 304 and 304a, bolts 305 and 305a as in FIG. 3. Dual attachment ears 39 and 39a are provided for attachment to plates 303 and 303a. Bolts 306 and 306a are provided for the attachment of ears 39 and 39a to the plates 303 and 303a. Bolts 307 and 307a secure the posts 301 and 301a to the plates 303 and 303a. A seal 308 is shown in partial section. The fitting 30 otherwise is identical to the fitting 10 including main conduit 31 extension conduit 32, cap 36, clamp 37 and a release plug 33 and harness 34 in the extension conduit 32. As shown in FIG. 5, the carrier 300 is mounted between two walls 104 and 105. The pipes 304 and 304a are provided through the walls and are mounted through rings 309 and 309a. Seal 41 is provided between the pipe 304 and the opening 40. Pipe 106 extends to the next floor (not shown).

The overall length of the fitting 10 or 30 is preferably about 18 inches (45.7 cm), with the larger internal diameter extension conduit 12 set at an angle alpha of 30 degrees from the vertical axis (a-a). The fitting is preferably made of gray cast iron in accordance with ASTM A-48 and design specification 474-75. The surface of the fitting is coated with SA 2702 Fire Protection Red heat resistant silicone coating.

Table 1 shows the preferred specifications for the iron portion of the fitting 10.

TABLE 1

ASTM A - 48
Gray Cast Iron With Controlling Sections .25 + .50"

| Physical Properties | |
|---|---|
| Tensile Strength | 25,000 PSI Minimum |
| Brinell Hardness | 160 to 212 |
| Chemical Composition | |
| Carbon | 3.30–3.60% |
| Silicon | 1.85–2.45% |
| Manganese | .40–.80% |
| Phosphorus | .15% Max. |
| Sulphur | .20% Max. |
| Microstructure | |
| Flake Graphite | Type A and B |
| Matrix | 60% to 100% Pearlite |
| | 10% Max. Fine, Evenly Distributed Carbides |
| | ⅛" Max. D Graphite at Thin Edges with Less Than 40% Carbides |
| | 10% Max. Steadite Outlining Original Austenite Grain Boundaries |

The plug 13 is spheroconically or truncated conically shaped and made of the same cast iron material as the main conduit 11 and extension conduit 12 of the fitting 10 previously described in Table 1. The plug 13 is sized to drop through the extension conduit 12 and into the main conduit 11 of the stack fitting 10, where the plug 13 lodges to block flame penetration and prevent the fire stack effect. The ring 13a of plug 13 is preferably about 0.25 inch (0.64 cm) smaller in diameter than the internal diameter of the extension conduit and slightly larger by 0.125 inch (0.318 cm) than the internal diameter at 11a and 11b of the main conduit 11. This allows the plug 13 to firmly lodge in the main conduit 11 upon release. The chamber 21 has a diameter of about 4.5 inches (8.07 cm).

The thermal release harness 14 is preferably composed of either polyethylene or low C.P.E. type 207, preferably the latter, and designed to hold the flamestop plug 14 in place in the extension conduit 12 of the stack fitting 10. Temperatures greater than 250° F. inside the fitting 10 will cause the harness 14 to break away and collapse, triggering release of the flamestop plug 13.

The cap 16 is preferably composed of flexible PVC. A series 300 stainless steel ring clamp 17 or 37 holds the cap 16 or 36 in place on the cast iron extension conduit 12 or 32. The cap 16 or 36 allows pressure testing of the stem of pipes 106 and fitting 10 or 30. The harness 14 includes slots 14f around the ring 14c to lock in the plug 13 in the harness 14. The ring clamp 17 or 37 allows removal of the cap 16 or 36 for periodic inspection of the plug 13 and harness 14.

The O ring 18 is preferably composed of grade SCE-41 black neoprene/EPT/SBR blend conforming to ASTM D-1056-67. It provides a watertight seal between the stack fitting 10 and the coupling 100.

The angle alpha is preferably between about 10° and 45°. The angle is 30° as shown in FIGS. 1 and 2 is preferred to insure gravity feed of the plug 13 upon rupture of the harness 14. It will be appreciated; however, that various spring means (not shown) between the cap 16 and the plug 13 can be used to urge the plug into the main conduit 11; however, these are expensive and unnecessary.

In normal operation of the building, the stack fitting 10 or 30 functions as a leak proof fluid passage through the floor 101. When fire breaks out in the building on the lower side of floor 101, the pipe melts if it is composed of PVC. This allows heating of the iron main conduit 11 and extension conduit 12. When the temperature reaches 225° F. (106° C.) (which is well below normal flammability levels of PVC and most other plastic materials) the harness 14 ruptures and the plug 13 is released into the main conduit 11. The result is that the fire can not penetrate to the upper side of floor 101. Also the cap 16 can melt causing release of the plug 13 by melting the harness 14. Based upon Underwriters Laboratories (UL) Tests, the stack fitting 10 installed in the coupling 100 has been given up to a four (4) hour fire rating which is believed to be unprecedented in the building construction field.

As can be seen from the foregoing description, the present invention provides a unique device for the prevention of the spread of fire between floors of a building.

I claim:

1. An improved one piece fitting for a fluid connection to a water closet which is supported on a carrier mounted on a floor of a building and which fitting prevents spread of fire between the floor of the building through a plastic pipe connected to the fitting which comprises:
   (a) a non-flammable, fluid carrying main conduit having a first longitudinal axis between two opposed openings defining an inside diameter of the main conduit and an enlarged chamber between the openings and adapted to be connected into plastic pipes between floors of a building;
   (b) a non-flammable extension conduit from the enlarged chamber of the main conduit positioned with a second axis at an acute angle from the longitudinal axis of the main conduit with an opening;
   (c) a non-flammable plug having a diameter larger than the inside diameter of the main conduit and smaller than the enlarged chamber mounted in the extension conduit on a plastic support mounted on the extension conduit which is releasable by melting upon exposure of the support to heat less than necessary for heat destruction of the plastic pipe to which it is adapted to be fitted through the main conduit from a fire in the building in which it is adapted to be provided to thereby move into and close the main conduit, wherein the plastic support is provided by a harness with a strap upon which the plug rests, wherein the harness has two straps which are overlapping in an x pattern joined to a holding ring which is mounted inside the extension conduit and wherein the strap is broken by heat from a fire to release the plug which moves by gravity into the main conduit;
   (d) closure means for the extension conduit opening;
   (e) a short pipe connected to a side opening in the main conduit in the enlarged chamber for fluid connection to a water closet; and
   (f) attachment means on the fitting for connecting the fitting to the carrier.

2. The fitting of claim 1 wherein the main conduit and extension conduit each having a circular internal cross-section and wherein the plug is shaped as a cone with a base and with a truncated apex positioned towards the main conduit.

3. The fitting of claim 2 wherein the plug has an integral ring adjacent the base having a diameter slightly smaller than the internal diameter of the extension conduit and larger than the main conduit.

4. The fitting of claim 1 wherein the straps and holding ring are integral.

5. The fitting of claim 1 wherein the holding ring is attached adjacent the extension conduit opening.

6. The fitting of claim 5 wherein the straps and holding ring are attached to the extension conduit by means of a heat destructible closure means for the extension conduit opening.

7. The fitting of claim 6 wherein the closure means includes a cap mounted over extension conduit opening and secured by a ring clamp.

8. The fitting of claim 1 wherein the second axis is at an angle between about 10 and 45 degrees from the first axis so that when the first axis is vertical the plug will fall by gravity into the main conduit from the extension conduit upon release.

* * * * *